United States Patent
Stevens et al.

(10) Patent No.: US 7,572,532 B2
(45) Date of Patent: Aug. 11, 2009

(54) OXIDE MATERIAL AND A FUEL CELL ELECTRODE CONTAINING SAID MATERIAL

(75) Inventors: Philippe Stevens, Karlsruhe (DE); Emmanuelle Boehm, St Subin de Médox (FR); Jean-Marc Basset, Canejan (FR); Fabrice Mauvy, Canejan (FR); Jean-Claude Grenier, Cadaujac (FR)

(73) Assignees: Electricite de France, Paris (FR); Centre National de la Recherche, Paris (FR)

( * ) Notice: Subject to any disclaimer, the term of this patent is extended or adjusted under 35 U.S.C. 154(b) by 422 days.

(21) Appl. No.: 10/599,132

(22) PCT Filed: Mar. 21, 2005

(86) PCT No.: PCT/FR2005/000683

§ 371 (c)(1),
(2), (4) Date: Sep. 20, 2006

(87) PCT Pub. No.: WO2005/099003

PCT Pub. Date: Oct. 20, 2005

(65) Prior Publication Data

US 2007/0207919 A1 Sep. 6, 2007

(30) Foreign Application Priority Data

Mar. 24, 2004 (FR) .................................. 04 03036

(51) Int. Cl.
*C01F 17/00* (2006.01)
*H01M 4/86* (2006.01)

(52) U.S. Cl. .................. 429/30; 423/21.1; 423/263; 423/592.1; 423/593; 423/596; 423/600; 423/617; 136/236.1; 136/238; 136/400

(58) Field of Classification Search ............ 423/593.1, 423/596, 600, 617, 21.1, 263, 592.1; 136/236.1, 136/238, 240; 429/30; *C01F 17/00*; *H01M 4/86*
See application file for complete search history.

(56) References Cited

U.S. PATENT DOCUMENTS 3,138,490 A * 6/1964 Tragert et al. ................. 429/12

(Continued)

FOREIGN PATENT DOCUMENTS

WO WO 03/081686 10/2003

OTHER PUBLICATIONS

Deng et al (Electrochimica Acta 2004, 29:1823-1830.*

(Continued)

*Primary Examiner*—Melvin C Mayes
*Assistant Examiner*—Jun Li
(74) *Attorney, Agent, or Firm*—Miller, Matthias & Hull

(57) ABSTRACT

The invention relates to an oxide material of general formula (I) $A_{2-x-y}A'_xA''_yM_{1-z}M'_zO_{4+\delta}$, wherein A and A' are independently a metal cation of a group formed by lanthanides and/or alkalis and/or alkaline earths, A" is a cationic gap, i.e. a cation vacancy A and/or A', M and M' are independently a metal of a group formed by transition metals such as $0<y<0.30$, preferably $0<y=0.20$; $0<\delta<0.25$, preferably $0<\delta<0.10$; $0=x=1$; and $0=z=1$. An air electrode containing said material and an electric power producing device in the form of a fuel cell provided with at least one electrochemical cell comprising said electrode are also disclosed.

9 Claims, 2 Drawing Sheets

U.S. PATENT DOCUMENTS

| | | | | |
|---|---|---|---|---|
| 3,281,273 | A | * | 10/1966 | Oser ............................ 429/13 |
| 5,037,525 | A | * | 8/1991 | Badwal ........................ 204/421 |
| 5,744,015 | A | * | 4/1998 | Mazanec et al. ............. 204/295 |
| 6,447,944 | B1 | * | 9/2002 | Akimune et al. .............. 429/33 |
| 6,632,554 | B2 | * | 10/2003 | Doshi et al. ................... 429/30 |
| 7,291,781 | B2 | * | 11/2007 | Funahashi et al. ......... 136/236.1 |
| 2003/0188637 | A1 | * | 10/2003 | Ito et al. ....................... 96/108 |
| 2005/0201919 | A1 | * | 9/2005 | Yu et al. ...................... 423/263 |
| 2006/0234066 | A1 | * | 10/2006 | Zurbuchen .................. 428/450 |

OTHER PUBLICATIONS

Colomer et al (British Ceramic Proceedings, 63 Grain Boundary Engineering of Electronic Ceramics, 2003:74-80).*

Database WPI Section Ch. Week 200012 Derwent Publications Ltd., London, GB; Class E36, AN 2000-127349 XP002303153 & CN1 234 291 A (Univ Nanjing Chem) Nov. 10, 1999 abstract.

Hor P-H et al: "The Study of the Stripe Phase La1 48Nd0 4Sr0 12CuO4 by electromechanical doping" Physica C, North-Holland Publishing, Amsterdam, NL, vol. 341-348, Nov. 2000, pp. 1743-1746, XP004316067 ISSN/ 0921-4534 p. 1744, paragraph 2.

Hor P-H et al: "A study of the 15K Superconducting Transition in La2CuO4+delta" Physica C, North-Holland Publishing, Amsterdam, NL, vol. 341-348, Nov. 2000, pp. 1585-1586, XP004316009 ISSN: 0921-4534 "the whole document".

Honma T et al: "Superconductivity and charge redistribution under high pressure in the underdoped La1.916Sr0 084CuO4" Physica C, North-Holland Publishing, Amsterdam, NL. vol. 341-348, Nov. 2000, pp. 1933-1934, XP004316140 ISSN: 0921-4534 "the whole document".

Padalia et al : Superconductor Science and Technology, vol. 11, No. 12, 1998, pp. 1381-1385, XP001184095 "the whole document".

Lascialfari et al : Physical Review B Condensed Matter and Materials Physics, vol. 68, No. 10, 2003, pp. 104524/1-104524/4, XP002303152 "the whole document".

XP-002303153, WPI/Derwent (2000).

International Search Report for PCT Application No. PCT/FR2005/000683, report dated Jul. 27, 2005.

* cited by examiner

OXIDE MATERIAL AND A FUEL CELL ELECTRODE CONTAINING SAID MATERIAL

CROSS REFERENCE TO RELATED APPLICATION

This is the U S. National Phase of International Application No PCT/FR2005/000683, filed 21 Mar. 2005, the entire disclosure of which is incorporated by reference.

FIELD OF THE DISCLOSURE

The invention relates to a novel oxide material. The invention also relates to an electrode comprising such a material. Finally, the invention relates to a device for producing electrical energy of the fuel cell type comprising at least one electrochemical cell comprising a cathode which is such an electrode.

BACKGROUND OF THE DISCLOSURE

A cell, or secondary battery such as an electrochemical cell, converts chemical energy into electrical energy. In a fuel cell, hydrogen, coming for example from any carbon-based fuel such as gas, a petroleum based oil product, or methanol, is combined with oxygen drawn from the air in order to produce electricity, water and heat by means of an electrochemical reaction. The core of the fuel cell is composed of an anode, a cathode and an electrolyte which is a solid ceramic-based electrolyte. The oxygen ions flow through the electrolyte and the electrical current flows from the cathode to the anode.

SOFCs (Solid Oxide Fuel Cells) are fuel cells that usually operate at high temperatures, of around 650 to 1000° C. They can be used in steady-state high-power (250 kW) and low-power (1 to 50 kW) supply systems. They are potentially advantageous owing to their high electrical efficiency (generally around 50 to 70%) and owing to the use of the heat that they produce.

Current SOFC materials operate at temperatures of about 900 to 1000° C. and will be explained below. The solid electrolyte most commonly used is yttrium-stabilized zirconia or YSZ. The anode, which is in particular the site of the reaction between $H_2$ and the $O^{2-}$ anions coming from the electrolyte, is most commonly a cermet (a metal/ceramic composite) of the type in which nickel is dispersed in stabilized zirconia (YSZ), optionally doped with ruthenium Ru. The cathode, which collects the charges and is the site of the reduction of oxygen, which then diffuses in the $O^{2-}$ anion state through the electrolyte, is most usually based on an oxide of perovskite structure, such as lanthanum manganite doped with strontium $(La,Sr)MnO_{3\pm\delta}$. Finally, bipolar plates, or interconnectors, are present, generally there being two of them, and their function is to collect the charges at the anode and at the cathode and to separate the two gases, namely fuel ($H_2$) and oxidizer ($O_2$).

Now, the operation of the cell at such a high temperature poses many problems, especially the cost of the interconnectors and the chemical and above all mechanical behavior of the materials at temperature. This is why it has been envisaged to lower the operating temperature of the cell, to around 600-800° C. This would allow Inconel® (a heat-resistant alloy based on Ni, Cr and Fe) or stainless steels to be used as interconnectors. The electrolyte that has been envisaged for replacing YSZ is cerium oxide doped with gadolinium oxide, $CeO_2:Gd_2O_3(Ce_{0.9}Gd_{0.1}O_{1.95})$ with a fluorite structure, or a substituted $LaGaO_3$ perovskite $La_{0.9}Sr_{0.1}Ga_{0.8}Mg_{0.2}O_{2.85}$.

The anode could be based on vanadium chromite. As regards the cathode, various materials have been studied, including perovskites of the $ABO_3$ type, and in particular doped $LaMnO_3$ for reasons of good mechanical behavior, which may or may not be deficient on the A sites, and above all oxygen-deficient perovskites $ABO_{3-\delta}$ such as $(La,Sr)CoO_{3-\delta}$. It remains the case that, at the present time, there is no material making it possible to use the cathode with, simultaneously, high electronic conductivity, a high ionic conductivity, good thermal stability and sufficient efficiency from the industrial standpoint.

It was to solve these problems of the prior art that another type of oxide material had to be sought. The material according to the invention does this,

SUMMARY OF THE DISCLOSURE

The material according to the invention is an oxide material of the following general formula:

$$A_{2-x-y}A'_xA''_yM_{1-z}M'_zO_{4+\delta} \quad (1)$$

where:

A is a metal cation belonging to the group formed by lanthanides and/or alkali metals and/or alkaline-earth metals;

A' is at least one metal cation belonging to the group formed by lanthanides and/or alkali metals and/or alkaline-earth metals;

A" is a cationic vacancy, that is to say a cation A and/or cation A' vacancy;

M is a metal belonging to the group formed by metals of the transition elements; and M' is at least one metal belonging to the group formed by metals of the transition elements, said material being such that:

$0 < y < 0.30$, preferably $0 < y \leq 0.20$;

$0 < \delta < 0.25$, preferably $0 < \delta < 0.10$;

$0 \leq x \leq 2$; and $0 \leq z \leq 1$.

The above formula therefore includes the case in which x is equal to 0 or 2, that is to say the case in which only a single metal cation is present, and also, whether independent of the previous case or not, the case in which z is equal to 0 or 1, that is to say the case when only a single metal is present.

A' may represent several metal cations and M' may also, independently, represent several metals. A person skilled in the art knows how to rewrite formula (1) according to the number of components.

The presence of an oxygen superstoichiometry coefficient $\delta$ with a value strictly greater than 0 advantageously contributes to the ionic conductivity of the material.

According to one particularly preferred embodiment of the invention, M and M' are of mixed valency, that is to say such materials advantageously contribute to the electronic conductivity of the material.

Advantageously, such materials according to the invention exhibit good thermal stability in terms of composition. This has been shown by TGA (thermogravimetric analysis) in air and verified by X-ray diffraction at temperature on two materials according to the invention which are $Nd_{1.95}NiO_{4+\delta}$ and $Nd_{1.90}NiO_{4+\delta}$: measurement of the oxygen superstoichiometry coefficient $\delta$ with respect to temperature, over a range from room temperature, i.e. about 20° C., up to 1000° C.

shows no sudden changes and confirms that the weight loss is directly and only proportional to the variation in the oxygen content of the material.

Advantageously, the A" vacancies are distributed randomly. Electron diffraction patterns obtained by electron transmission microscopy of the material according to the invention, namely $Nd_{1.90}NiO_{4+\delta}$, reveal no elongation or smearing of the main (001) spots, showing perfect order along the c axis and the absence of intergrowth structures of the Ruddlesden-Popper type within the $A_2MO_{4+\delta}$ stacks, thus confirming such a random distribution of the neodymium vacancies.

The term "lanthanide" is understood according to the invention to mean lanthanum La or an element of the group of lanthanides such as Ce, Pr, Nd, Pm, Sm, Eu, Gd, Tb, Dy, Ho, Ex, Tm, Yb or Lu and Y. The term "alkali metal" is understood according to the invention to mean an element excluding hydrogen from group 1 (IUPAC version) of the Periodic Table of the Elements. The term "alkaline-earth metal" is understood according to the invention to mean an element of group 2 (IUPAC version) of the Periodic Table of the Elements. The term "transition metal" is understood according to the invention to mean an element of groups 3 to 14 (IUPAC version) of the Periodic Table of the Elements, including of course elements of period 4, such as titanium Ti or gallium Ga, elements of period 5, such as zirconium Zr or tin Sn, and elements of period 6, such as tantalum Ta or mercury Hg. Preferably, according to the invention, the transition metal is an element of period 4.

The material according to the invention is advantageously characterized by very detailed measurements of one or more (A and/or A')/(M and/or M') ratios by using a Castaing microprobe (or EPMA, standing for Electron Probe Microanalysis) which make it possible to bring out the cation vacancy structure of said material, In a preferred embodiment of the invention, said material is such that:
A and A' are independently chosen from the group formed by lanthanum La, praseodymium Pr, strontium Sr, calcium Ca and neodymium Nd, preferably neodymium Nd, strontium Sr and calcium Ca and even more preferably neodymium Nd, and such that:
M and M' are independently chosen from the group formed by chromium Cr, manganese Mn, iron Fe, cobalt Co, nickel Ni and copper Cu, preferably nickel Ni and copper Cu, and even more preferably nickel Ni.

In the particular cases according to the invention in which x is not equal to 0 or 2, and z is not equal to 0 or 1, the number of type A cations is at least two, namely A and A', and the number of type M cations is at least two, namely M and M'.

In such a case, preferably:
A is chosen from the group formed by lanthanum La, praseodymium Pr and neodymium Nd, preferably neodymium Nd; and
A' is chosen from the group formed by strontium Sr and calcium Ca, preferably calcium Ca;
M is chosen from the group formed by chromium Cr, manganese Mn, iron Fe, cobalt Co, nickel Ni and copper Cu, preferably nickel. Ni; and
M' is chosen from the group formed by manganese Mn, iron Fe, copper Cu and cobalt Co, preferably copper Cu and manganese Mn., In one particularly preferred embodiment according to the invention, the material has a crystallographic structure of $K_2NiF_4$ type shown for example in "*Inorganic Crystal Structures*", page 30 by B G Hyde and S Anderson, Wiley Interscience Publication (1988). The structure is thus formed from layers of oxygen-containing octahedra $MO_6$ shifted with respect to one another by ½ ½ ½, A atoms ensuring cohesion between the layers and additional Oi oxygens possibly being inserted between these layers in vacant interstitial sites.

In a preferred embodiment, the material according to the invention possesses an oxygen surface exchange coefficient k of greater than $1 \times 10^{-8}$ cm/s at 500° C. and $2 \times 10^{-6}$ cm/s at 900° C. in the case of oxygen. The variation in said coefficient follows an Arrhenius law, which makes it easy to calculate this coefficient for another temperature in the temperature range of interest in the invention. This value is generally difficult to achieve with the existing materials used in fuel cells.

In a preferred embodiment, independently of the previous embodiment or not, the material according to the invention possesses an electronic conductivity $\sigma_e$ of at least 70 S/cm, preferably at least 80 S/cm and even more preferably greater than 90 S/cm at 700° C.

In a preferred embodiment, independently of the previous embodiment or not, the material according to the invention possesses an oxygen diffusion coefficient of greater than $1 \times 10^{-9}$ cm$^2$/s at 500° C. and $1 \times 10^{-7}$ cm$^2$/s at 900° C. The variation in said coefficient follows an Arrhenius law, which makes it easy to calculate this coefficient for another temperature in the temperature range of interest to the invention,. This value is generally not achievable in the case of the existing materials used in fuel cells.

In one preferred embodiment, the material according to the invention possesses an oxygen surface exchange coefficient k of greater than $1 \times 10^{-8}$ cm/s at 500° C. and $2 \times 10^{-6}$ cm/s at 900° C. in the case of oxygen, an electronic conductivity $\sigma_e$ of at least 70 S/cm, preferably at least 80 S/cm and even more preferably greater than 90 S/cm at 700° C., and an oxygen diffusion coefficient of greater than $1 \times 10^{-9}$ cm$^2$/s at 500° C. and $1 \times 10^{-7}$ cm$^2$/s at 900° C.

The invention also relates to an electrode comprising at least one material according to the invention., Finally, the invention relates to a device for producing electrical energy, of the fuel cell type comprising at least one electrochemical cell comprising a solid electrolyte, an anode, and a cathode which is an electrode according to the invention. Said device also usually includes an anode interconnector and a cathode interconnector. Apart from the cathode, all the other components of said device are elements known to those skilled in the art.

Advantageously, the device according to the invention makes it possible to use the cathode according to the invention with both good electronic conductivity and good ionic conductivity, and also good thermal stability and sufficient efficiency from the industrial standpoint.

Finally, the invention relates to any process using such a device.

The invention also relates to the use of the electrode according to the invention as an oxygen pump electrode for gas purification.

BRIEF DESCRIPTION OF THE DRAWINGS

FIG. 1 is a graph showing, for various materials (a material according to the invention and two comparative materials), at various temperatures, the cathode overvoltage $\Delta V$ in mV as a function of current density j (in mA/cm$^2$).

FIG. 2 is a graph showing, for various materials (two materials according to the invention and one comparative material), the oxygen diffusion coefficient D* (in cm²/s) as a function of 1000/T (in K⁻¹), where T is the temperature.

FIG. 3 is a graph showing, for various materials (two materials according to the invention and one comparative material), the oxygen surface exchange coefficient k (in cm/s) as a function of 1000/T (n K⁻¹), where T is the temperature.

DETAILED DESCRIPTION OF THE DISCLOSURE

The following examples illustrate the invention without in any way limiting its scope, Two materials according to the invention were synthesized, namely $Nd_{1.95}NiO_{4+\delta}$ and $Nd_{1.90}NiO_{4+\delta}$, having respective y values of 0.05 and 0.10. These materials were synthesized by solid-state reaction of $Nd_2O_3$ and NiO oxides at 1100° C. or by mild chemical or sol-gel routes, for example from neodymium and nickel nitrates in solution. Their superstoichiometry values were $\delta=0.15$ and $\delta=0.06$ respectively, determined by an $Ni^{3+}$ chemical analysis (iodometry), Their electronic conductivities $\sigma_e$ measured at 700° C. were 100 S/cm and 80 S/cm respectively. Their oxygen surface exchange coefficients k were $5.5\times10^{-8}$ cm/s and $1.7\times10^{-8}$ cm/s at 500° C. respectively, and $5.5\times10^{-6}$ cm/s and $1.7\times10^{-6}$ cm/s at 900° C. respectively. Their oxygen diffusion coefficients were $3.2\times10^{-9}$ and $5.2\times10^{-9}$ cm²/s at 500° C. respectively and $3.5\times10^{-7}$ and $2.5\times10^{-7}$ cm²/s at 900° C. respectively. The percentage content of $Ni^{3+}$ cations at 700° C., determined by TGA (thermogravimetric analysis) in air, was 35% and 28% respectively. The variation in oxygen stoichiometry within this temperature range, in which the operating temperature of a fuel cell lies, was small and had no influence on the thermal expansion coefficient, which remained constant and equal to $12.7\times10^{-6}$ K⁻¹.

The electrochemical properties of these two materials according to the invention were evaluated in a three-electrode setup in a half-cell of the electrode material/YSZ/electrode material type in which the counterelectrode and the working electrode were symmetrical, these being painted onto the electrolyte and annealed at 1100° C. for two hours. The platinum reference electrode was placed far from the other two electrodes. The behavior of this material was analyzed under conditions close to those of an SOFC cell, that is to say under current and over a temperature range from 500 to 800° C. The measured cathode overvoltages had to be as low as possible. It was found, not surprisingly, that these overvoltages decreased strongly with temperature.

Figure 1:
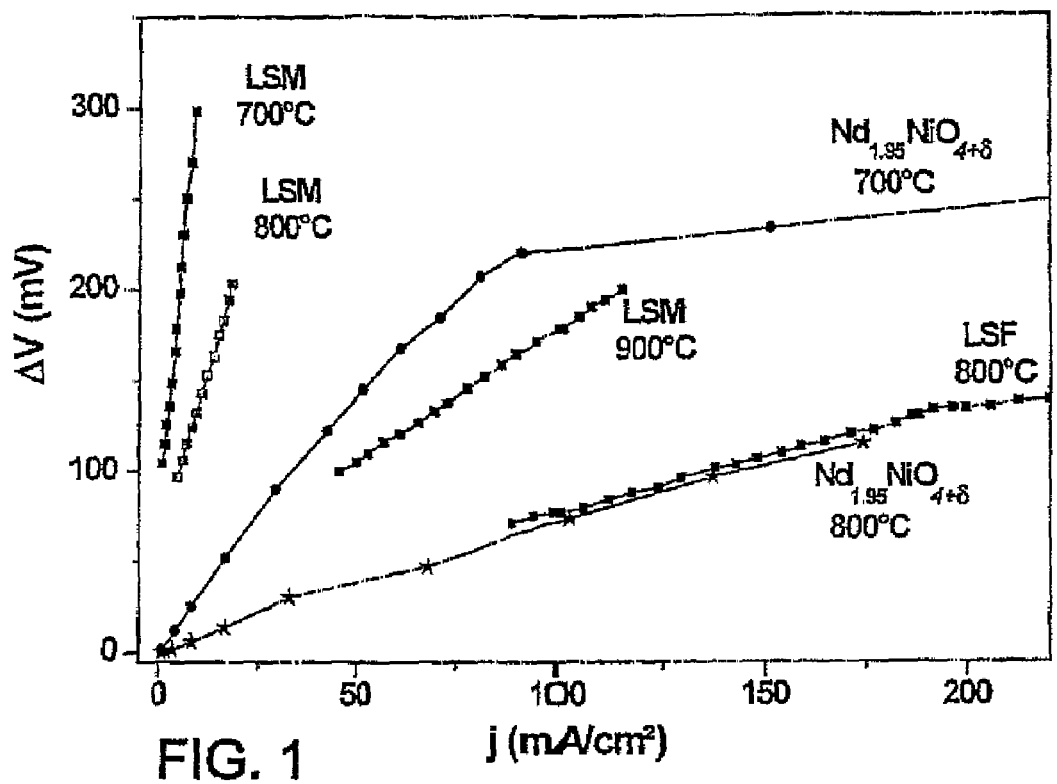
FIGS. 1 to 3 serve to illustrate the invention, in a nonlimiting fashion, by comparative graphs.

FIG. 1 is a graph showing, for various materials (one material according to the invention and two comparative materials), at various temperatures, the cathode overvoltage $\Delta V$ in mV as a function of j (in mA/cm²)

The cathode overvoltage of the material according to the invention with the particular composition $Nd_{1.95}NiO_{4+\delta}$ was then compared with the cathode overvoltages of conventional materials, namely LSM ($La_{0.7}Sr_{0.3}MnO_3$) and LSF ($La_{0.7}Sr_{0.3}FeO_3$) from data obtained from the literature (M Krumpelt et al., Proceedings European SOFC Forum (Lucerne 2002), published by J Huilsmans, Vol. 1, page 215). FIG. 1 shows curves indicating, for the materials tested, at various temperatures, the cathode overvoltage in mV as a function of the current density j in mA/cm² of the current passing through the cell. This shows that, highly advantageously, the performance of the $Nd_{1.95}NiO_{4+\delta}$ material according to the invention is superior, to that of these materials used.

Figure 2:
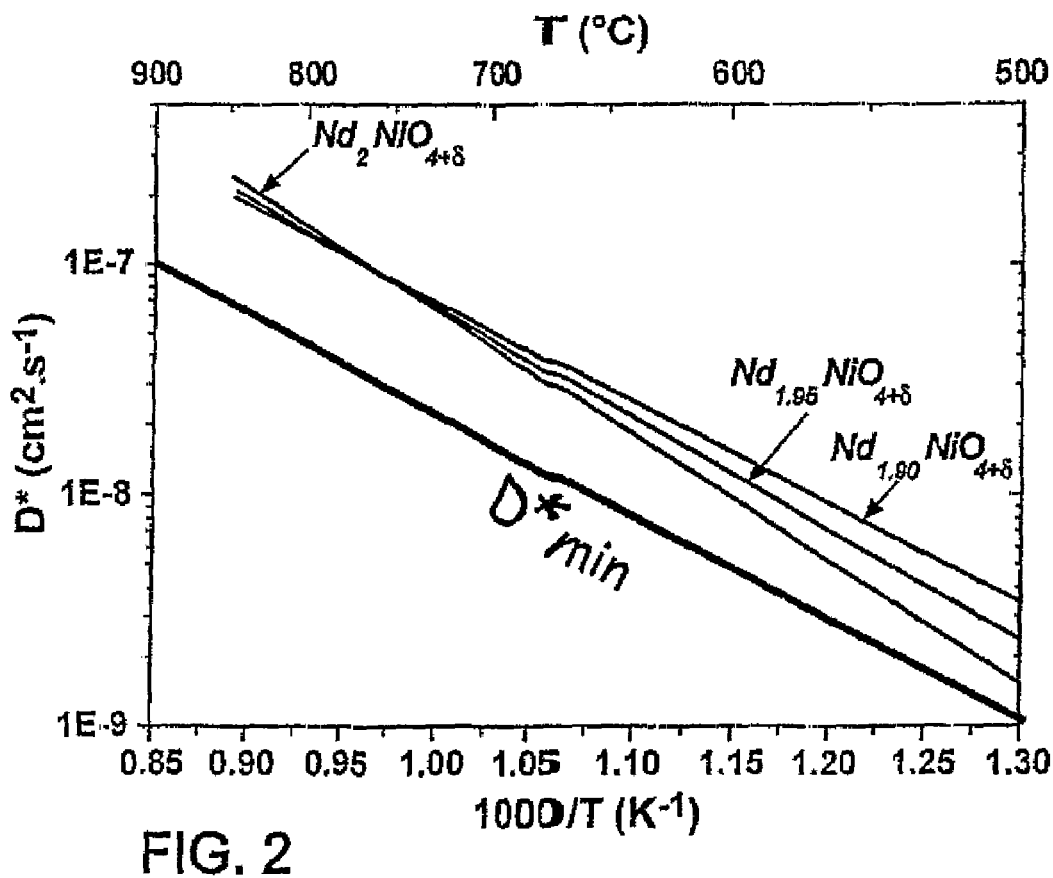

FIG. 2 is a graph showing, for various materials (two materials according to the invention and one comparative material), the oxygen diffusion coefficient D* (in cm²/s) as a function of 1000/T (in K⁻¹), where T is the temperature. Each curve is a straight line. The two materials according to the invention are $Nd_{1.95}NiO_{4+\delta}$ and $Nd_{1.90}NiO_{4+\delta}$. The comparative material is $Nd_2NiO_{4+\delta}$, that is to say a material with an oxygen superstoichiometry but no cation vacancy. It may be seen that, within the temperature range of interest to the invention, the materials according to the invention generally have, to within the measurement error, a higher- coefficient D*, and are therefore more useful. FIG. 2 also shows the straight line indicating the minimum D*, or $D^*_{min}$, according to the invention.

Figure 3:
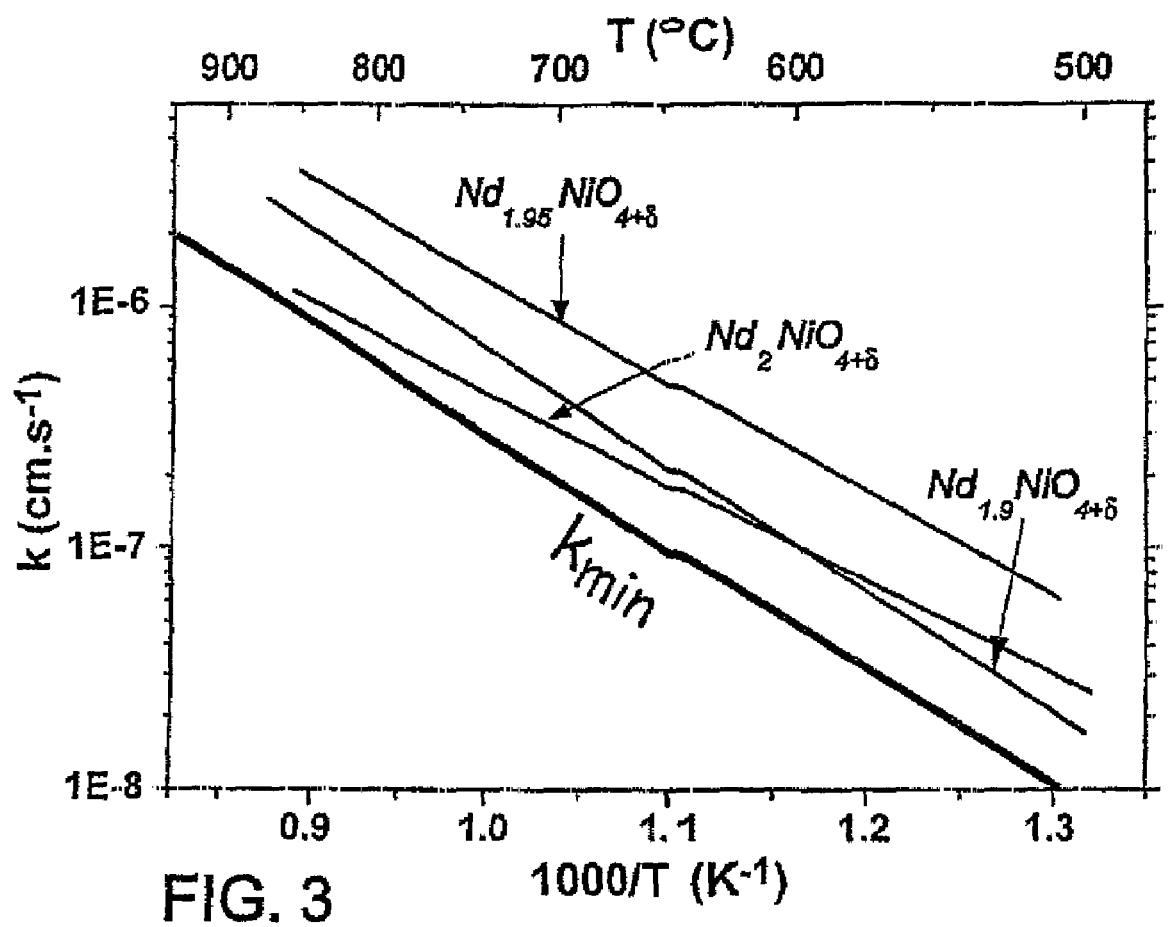

FIG. 3 is a graph showing, for various materials (two materials according to the invention and one comparative material), the oxygen surface exchange coefficient k (in cm/s) as a function of 1000/T (in K⁻¹), where T is the temperature. Each curve is a straight line. The two materials according to the invention are $Nd_{1.95}NiO_{4+\delta}$ and $Nd_{1.90}NiO_{4+\delta}$. The comparative material is $Nd_2NiO_{4+\delta}$, i.e. a material with an oxygen superstoichiometry but no cation vacancy. It may be seen that, within the temperature range of interest to the invention, the materials according to the invention have a higher coefficient k, and are therefore more useful. FIG. 3 also shows the straight line indicating the minimum D*, or, $D^*_{min}$, according to the invention.

The invention claimed is:

1. An oxide material of the following general formula:

$$A_{2-x-y}A'_xA''_yM_{1-z}M'_zO_{4+\delta} \tag{1}$$

where:
A is a metal cation selected from the group consisting of lanthanides, alkali metals, and alkaline-earth metals;
A' is at least one metal cation selected from the group consisting of lanthanides alkali metals, and alkaline-earth metals;
A" is a cationic vacancy, that is to say a cation A and/or cation A' vacancy;
M is a metal selected from the group consisting of transition metals; and
M' is at least one metal selected from the group consisting of transition metals said material being such that:

$0<y<0.30$, $0<\delta<0.25$, $0\leq x\leq 2$; and $0\leq z\leq 1$.

2. The oxide material according to claim 1, wherein:
A and A' are independently selected from the group consisting of lanthanum La, praseodymium Pr, strontium Sr, calcium Ca and neodymium Nd, and
M and M' are independently selected from the group consisting of chromium Cr, manganese Mn, iron Fe, cobalt Co, nickel Ni and copper Cu.

3. The oxide material according to claim 1, wherein:
A is selected from the group consisting of lanthanum La, praseodymium Pr and neodymium Nd,
A' is selected from the group consisting of strontium Sr and calcium Ca,
M is selected from the group consisting of chromium Cr, manganese Mn, iron Fe, cobalt Co, nickel Ni and copper Cu; and
M' is selected from the group consisting of manganese Mn, iron Fe, cooper Cu and cobalt Co.

4. The material according to claim 1 having a crystallographic structure of the $K_2NiF_4$ type.

5. The material according to claim 1 having an oxygen surface exchange coefficient k of greater than $1\times10^{-8}$ cm/s at 500° C. and greater than $2\times10^{-6}$ cm/s at 900° C. in the case of oxygen.

6. The material according to claim 1 having an electronic conductivity $\sigma_e$ of at least 70 S/cm.

7. The material according to claim 1 having an oxygen diffusion coefficient of greater than $1\times10^{-9}$ cm²/s at 500° C. and greater than $1\times10^{-7}$ cm²/s at 900° C.

8. An electrode comprising the material as defined in claim 1.

9. A fuel cell comprising at least one electrochemical cell comprising a solid electrolyte, an anode, and a cathode wherein the cathode is an electrode as defined claim 8.

* * * * *